Nov. 6, 1928.
P. UPHAM
1,690,212
LUBRICATING APPARATUS
Filed Feb. 1, 1923
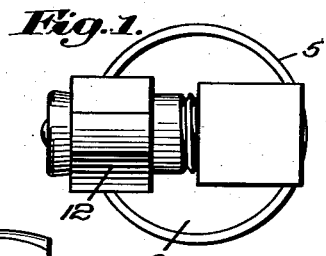
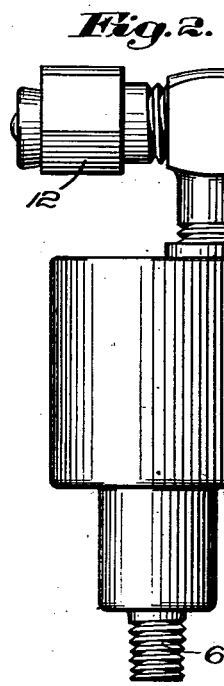
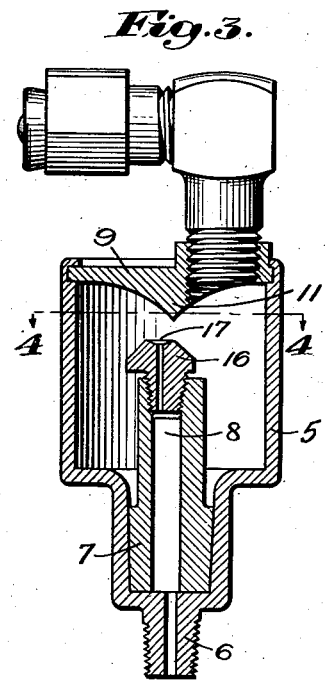
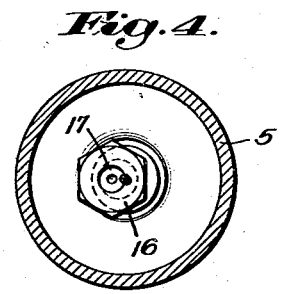
Inventor:
Preston Upham,
by Emery, Booth, Janney & Varney.
Attys Patented Nov. 6, 1928.

1,690,212

UNITED STATES PATENT OFFICE.

PRESTON UPHAM, OF BROOKLINE, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed February 1, 1923. Serial No. 616,279.

This invention pertains to improvements in lubricating apparatus. It is among the objects of the invention to provide a lubricating apparatus capable of feeding lubricant under pressure from a detachable device such as an oil gun and of storing a quantity of lubricant to be fed to the bearing by gravity by a splash system.

In the drawings, which show a preferred form of one embodiment of my invention:

Figure 1 is a plan view of an oil cup;

Fig. 2 is a side elevation thereof;

Fig. 3 is a view similar to Fig. 2, but showing the oil cup proper in section; and Fig. 4 is a section on the line 4—4 of Fig. 3.

Referring to the drawings and to the preferred form of my invention selected for illustrative purposes, I have shown an oil cup having a body portion 5 presenting a threaded end 6 adapted to be screwed into the part to be lubricated. Within the body 5, I have shown an upstanding tubular riser 7 having an aperture 8 therethrough to permit passage of lubricant. At the top of the oil cup, I have provided a plate 9 having a central downwardly extending portion 11. For filling the cup and for providing pressure if desired on the part to be lubricated, I have shown a lubricating nipple 12 of a type adapted to cooperate with a suitable pressure lubricating gun, such, for instance, as that shown in the application of Howard J. Murphy, Serial No. 543,654, filed March 14, 1922.

When the lubricating gun is connected to the nipple 12 and pressure is applied, the lubricant will be fed under pressure into the cup 5, filling it and passing, also under pressure, through the aperture 8 to the part to be lubricated so that if there is any stoppage from hardened lubricant, dirt or other cause, this will be forced out of the way by the pressure. When pressure is relieved, a certain amount of the lubricant contained in the upper part of the cup will flow through the bearing, providing flushing thereof over a considerable period.

My device is particularly adapted for use in connection with automobiles or other mechanisms wherein there is considerable motion of the parts to provide for splashing of the lubricant held within the cup. The invention is particularly useful in connection with the lubrication of king bolts on the front axles of automobiles. When the excess of lubricant above the effective top of the aperture 8 has flowed to the bearing, the lubricant contained in the cup below such top will remain there except when the vehicle is in motion, at which time the movement will throw the liquid against the under surface of the top 9 and a certain portion thereof will run by gravity to the point 11, dropping therefrom into the passage 8. The effective area of the passage 8 may be such as to provide against excessive feed of lubricant, but I prefer to provide an adjustment typified by the plug 16 having an opening therethrough of relatively small cross-section and eccentric both to the passage 8 and to the point 11, being so disposed that as the plug 16 is turned, the discharge point 11 in the top of the cup will drop either directly into the center of a funnel-shaped receiving orifice 17 above the passage through the part 16 or on one edge thereof so that the lateral movement of the car will cause some of the drops to fall into the receptacle and others to fall without the receptacle.

While I have shown and described a preferred form of one embodiment of my invention, it will be understood that I have done so for purposes of clarification and not for purposes of limitation. My invention is best defined in the following claims.

I claim:

1. An oil cup presenting a reservoir adapted to be filled from a source of supply under pressure, a part extending upwardly in said reservoir considerably above the bottom of the reservoir, said part presenting a discharge orifice, a top part presenting a surface sloping toward said discharge orifice to guide the lubricant into said orifice when splashed against said surface by agitating the cup, and means for adjusting one of said parts relative to the other part to vary the quantity of lubricant which said orifice may receive from said sloping surface.

2. An oil cup presenting a reservoir, a discharge outlet considerably above the bottom thereof, a top presenting a surface sloping toward the center thereof, said discharge orifice beneath the lowermost portion of said surface, and a quick detachable connection for engagement by a pressure lubricating gun presenting passages communicating with said reservoir whereby the part to be lubricated may be initially flushed under pressure of the lubricant from said lubricant gun and subsequently, when the part to be lubricated is agitated, may receive lubricant splashed from the lower portion of said cup onto said sloping surface and dripping into said discharge orifice, said discharge orifice adjustable to various positions relative to the converging point of said sloping surfaces.

3. An oil cup presenting a reservoir, a discharge outlet considerably above the bottom thereof, a top presenting a surface sloping toward the center thereof, said discharge orifice beneath the lowermost portion of said surface, and a quick detachable connection for engagement by a pressure lubricating gun presenting passages communicating with said reservoir whereby the part to be lubricated may be initially flushed under pressure of the lubricant from said lubricant gun and subsequently, when the part to be lubricated is agitated, may receive lubricant splashed from the lower portion of said cup onto said sloping surface and dripping into said discharge orifice, said discharge orifice provided in a part eccentrically movable relative to said cup and relative to the converging point of said sloping surfaces, whereby the proportion of drops from said converging point entering said orifice and not entering said orifice may be varied.

In testimony whereof, I have signed my name to this specification.

PRESTON UPHAM.